US011435813B2

(12) United States Patent
Sadowski

(10) Patent No.: US 11,435,813 B2
(45) Date of Patent: Sep. 6, 2022

(54) NEURAL NETWORK POWER MANAGEMENT IN A MULTI-GPU SYSTEM

(71) Applicant: Advanced Micro Devices, Inc., Santa Clara, CA (US)

(72) Inventor: Greg Sadowski, Cambridge, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 24 days.

(21) Appl. No.: 16/116,286

(22) Filed: Aug. 29, 2018

(65) Prior Publication Data

US 2020/0073461 A1 Mar. 5, 2020

(51) Int. Cl.
*G06F 1/32* (2019.01)
*G06F 1/329* (2019.01)
*G06T 1/20* (2006.01)
*G06N 3/02* (2006.01)
*G06N 20/00* (2019.01)

(52) U.S. Cl.
CPC .............. *G06F 1/329* (2013.01); *G06N 3/02* (2013.01); *G06N 20/00* (2019.01); *G06T 1/20* (2013.01)

(58) Field of Classification Search
None
See application file for complete search history.

(56) References Cited

U.S. PATENT DOCUMENTS

| 4,980,836 | A  | 12/1990 | Carter et al. |
| 5,396,635 | A  | 3/1995  | Fung |
| 5,617,572 | A  | 4/1997  | Pearce et al. |
| 5,692,202 | A  | 11/1997 | Kardach et al. |
| 6,334,167 | B1 | 12/2001 | Gerchman et al. |
| 6,657,534 | B1 | 12/2003 | Beer et al. |
| 6,657,634 | B1 | 12/2003 | Sinclair et al. |
| 7,028,200 | B2 | 4/2006  | Ma |
| 7,085,941 | B2 | 8/2006  | Li |
| 7,428,644 | B2 | 9/2008  | Jeddeloh et al. |
| 7,437,579 | B2 | 10/2008 | Jeddeloh et al. |
| 7,455,450 | B2 | 11/2008 | Liu et al. |
| 7,496,777 | B2 | 2/2009  | Kapil |

(Continued)

OTHER PUBLICATIONS

International Search Report and Written Opinion in International Application No. PCT/US2018/051916, dated Jan. 31, 2019, 10 pages.

(Continued)

*Primary Examiner* — Fahmida Rahman
(74) *Attorney, Agent, or Firm* — Kowert Hood Munyon Rankin and Goetzel PC; Rory D. Rankin

(57) ABSTRACT

Systems, apparatuses, and methods for managing power consumption for a neural network implemented on multiple graphics processing units (GPUs) are disclosed. A computing system includes a plurality of GPUs implementing a neural network. In one implementation, the plurality of GPUs draw power from a common power supply. To prevent the power consumption of the system from exceeding a power limit for long durations, the GPUs coordinate the scheduling of tasks of the neural network. At least one or more first GPUs schedule their computation tasks so as not to overlap with the computation tasks of one or more second GPUs. In this way, the system spends less time consuming power in excess of a power limit, allowing the neural network to be implemented in a more power efficient manner.

20 Claims, 10 Drawing Sheets

(56) References Cited

U.S. PATENT DOCUMENTS

| | | |
|---|---|---|
| 7,613,941 B2 | 11/2009 | Samson et al. |
| 7,743,267 B2 | 6/2010 | Snyder et al. |
| 7,800,621 B2 | 9/2010 | Fry |
| 7,802,060 B2 | 9/2010 | Hildebrand |
| 7,840,827 B2 | 11/2010 | Dahan et al. |
| 7,868,479 B2 | 1/2011 | Subramaniam |
| 7,873,850 B2 | 1/2011 | Cepulis et al. |
| 7,899,990 B2 | 3/2011 | Moll et al. |
| 8,181,046 B2 | 5/2012 | Marcu et al. |
| 8,402,232 B2 | 3/2013 | Avudaiyappan et al. |
| 8,656,198 B2 | 2/2014 | Branover et al. |
| 8,949,644 B2 | 2/2015 | Ma et al. |
| 9,122,648 B2 | 9/2015 | Askar et al. |
| 9,317,082 B2 | 4/2016 | Bates et al. |
| 9,347,836 B2 | 5/2016 | Temkine et al. |
| 9,563,257 B2 | 2/2017 | Fang et al. |
| 10,452,437 B2 | 10/2019 | Majumdar et al. |
| 2005/0086029 A1 | 4/2005 | Cascaval et al. |
| 2005/0216222 A1 | 9/2005 | Inoue |
| 2006/0271649 A1 | 11/2006 | Tseng et al. |
| 2007/0220293 A1* | 9/2007 | Takase ............... G06F 1/3203 713/320 |
| 2009/0070607 A1* | 3/2009 | Safford ............... G06F 1/3203 713/320 |
| 2010/0185882 A1* | 7/2010 | Arnold ................ G06F 1/3203 713/320 |
| 2011/0083023 A1 | 4/2011 | Dickens et al. |
| 2011/0264934 A1 | 10/2011 | Branover et al. |
| 2012/0254526 A1 | 10/2012 | Kalyanasundharam |
| 2013/0144549 A1 | 6/2013 | Temkine et al. |
| 2013/0155081 A1* | 6/2013 | Khodorkovsky ..... G06F 1/3206 345/522 |
| 2013/0179621 A1 | 7/2013 | Smith et al. |
| 2013/0311804 A1 | 11/2013 | Garg et al. |
| 2014/0059556 A1 | 2/2014 | Barsness et al. |
| 2015/0169363 A1 | 6/2015 | Anderson et al. |
| 2015/0346800 A1 | 12/2015 | Kumar |
| 2017/0031720 A1* | 2/2017 | Sarkar .................. G06F 9/5027 |
| 2017/0105540 A1* | 4/2017 | Jacobs ................ A47C 1/0355 |
| 2017/0160781 A1* | 6/2017 | Piga ..................... G06F 1/3206 |
| 2017/0277564 A1 | 9/2017 | Coteus et al. |
| 2017/0353926 A1 | 12/2017 | Zhu et al. |
| 2017/0373955 A1* | 12/2017 | Kocoloski ............ G06F 9/4893 |
| 2018/0157311 A1 | 6/2018 | Maisuria et al. |
| 2019/0155785 A1* | 5/2019 | Park ................... G06F 11/3024 |
| 2019/0204899 A1 | 7/2019 | Tsien et al. |

OTHER PUBLICATIONS

Yuan et al., "Buffering Approach for Energy Saving in Video Sensors", 2003 International Conference on Multimedia and Expo, Jul. 2003, 4 pages.

"Intel Power Management Technologies for Processor Graphics, Display, and Memory: White Paper for 2010-2011 Desktop and Notebook Platforms", Intel Corporation, Aug. 2010, 10 pages.

Coskun et al., "Temperature Aware Task Scheduling in MPSoCs", Proceedings of the Conference on Design, Automation and Test in Europe, Apr. 16, 2007, pp. 1659-1664, EDA Consortium, San Jose, CA, USA.

Duley et al., U.S. Appl. No. 09/751,865, entitled "Temperature Measurement System and Method", filed Dec. 29, 2000, 27 pages.

Yang et al., "Dynamic Thermal Management through Task Scheduling", IEEE International Symposium on Performance Analysis of Systems and Software, Apr. 20, 2008, pp. 191-201, IEEE Computer Society, Washington, D.C., USA.

Choi, et al., "Thermal-aware Task Scheduling at the System Software Level", Proceedings of the 2007 International Symposium on Low Power Electronics and Design, Aug. 27, 2007, pp. 213-218, ACM, New York, NY, USA.

\* cited by examiner

NEURAL NETWORK POWER MANAGEMENT IN A MULTI-GPU SYSTEM

BACKGROUND

Description of the Related Art

An emerging technology field is machine learning, with a neural network being one type of a machine learning model. Neural networks are used in a wide variety of applications (e.g., hand-written digit classification, face detection). However, neural networks often use significant amounts of processing resources that consume a large amount of power. For example, some systems implement neural networks using multiple graphics processing units (GPUs) (e.g. GPUs placed on the same card, GPUs located in the same server). These multi-GPU systems often have common power supplies with a fixed power limit. When multiple GPUs work together to implement a neural network, the performance of the system is limited by the total power that all GPUs have to share.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for implementing a neural network on a multi-GPU system are disclosed herein. In one implementation, a computing system includes at least a plurality of processing units (e.g., GPUs) and a common power supply shared by the plurality of processing units. In one implementation, the computing system implements a neural network on the plurality of processing units. The plurality of processing units share information regarding power consumption and task execution phases with each other. In one implementation, the plurality of processing units are arranged together in a ring topology. In other implementations, the plurality of processing units are connected in other arrangements.

In one implementation, the plurality of processing units monitor the amount of time that total power consumption exceeds or is equal to a power limit for the common power supply. The plurality of processing units also monitor the task execution phases and the alignment of these phases among the plurality of processing units. If task execution phases are aligned among a threshold number of processing units, and if this alignment is causing total power consumption to exceed the power limit of the common power supply, then the plurality of processing units initiate a change in the alignment of task execution phases (e.g., change the scheduling of execution of tasks and/or task phases to reduce overlap with tasks being executed by other processing units). In one implementation, at least one processing unit delays the start of execution of a given task phase. By delaying the start of execution of the given task phase, the at least one processing unit spreads out the power consumption over a previously unused interval which can help reduce the time the power supply is at its power limit. Additionally, delaying the start of execution of the given phase can result in a more efficient utilization of the available power.

Figure 1:
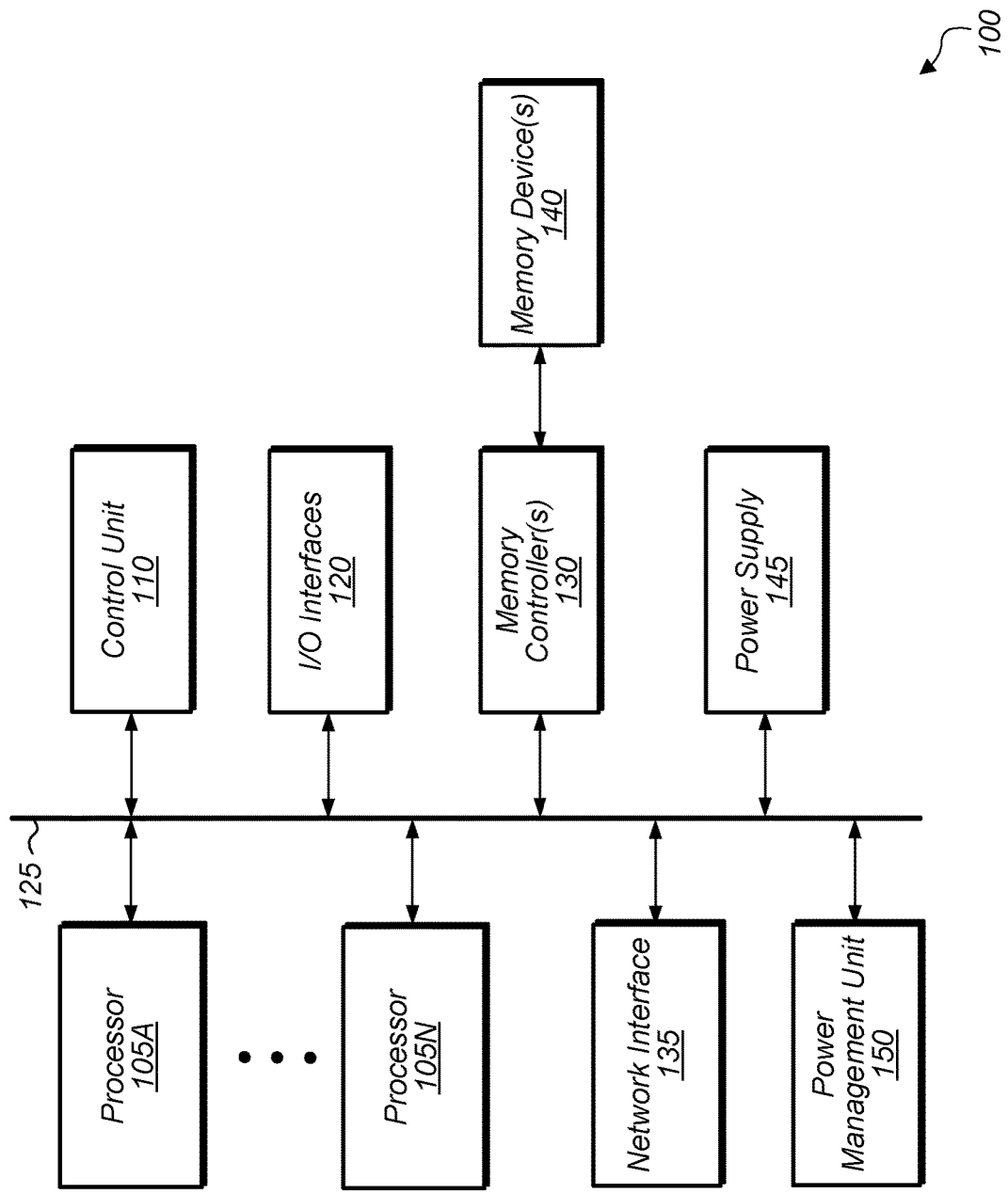
FIG. 1 is a block diagram of one implementation of a computing system.

Referring now to FIG. 1, a block diagram of one implementation of a computing system 100 is shown. In one implementation, computing system 100 includes at least processors 105A-N, control unit 110, input/output (I/O) interfaces 120, bus 125, memory controller(s) 130, network interface 135, memory device(s) 140, power supply 145, and power management unit 150. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processors 105A-N include a plurality of GPUs which are implementing a neural network while drawing power from a common power supply 145. In various implementations, the plurality of GPUs are included on a single circuit card, are located on multiple circuit cards within a common enclosure, or otherwise. In these implementations, power supply 145 is limited in the amount of power it can deliver to the plurality of GPUs. To ensure optimal performance while operating under a given power limit, the plurality of GPUs communicate with each other and stagger the alignment of computation phases of the neural network layers being implemented. These techniques as well as other techniques for implementing a neural network while meeting strict power requirements and at the same time ensuring adequate performance are described in the remainder of the disclosure. Other techniques for meeting other goals and/or requirements are also described.

Memory controller(s) 130 are representative of any number and type of memory controllers accessible by processors 105A-N. Memory controller(s) 130 are coupled to any number and type of memory devices(s) 140. Memory device(s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, media recording devices, external storage devices, network interface cards, and so forth. Network interface 135 is used to receive and send network messages across a network. Bus 125 is representative of any type of bus or fabric with any number of links for connecting together the different components of system 100.

In one implementation, power management unit 150 monitors and/or controls various power-performance states of components within system 100. Responsive to detecting various events, the power management unit 150 causes other components within system 100 to either increase or decrease their current power-performance state. In various implementations, changing a power-performance state includes changing a current operating frequency of a device and/or changing a current voltage level of a device. In one implementation, if a power limit for power supply 145 is reached and/or exceeded, power management unit 150 reduces the power-performance states of processors 105A-N. When the power-performance states of processors 105A-N are reduced, this causes the computing tasks being executed by processors 105A-N to take longer to complete. Also, in some cases, processors 105A-N are in phase such that they are drawing peak power from power supply 145 at the same time while also drawing minimal power from power supply 145 at the same time. This alignment of phases by processors 105A-N results in an inefficient use of power supply 145.

In one implementation, the power limit for power supply 145 is exceeded when a plurality of processors 105A-N are implementing a neural network and when computation tasks performed by processors 105A-N are aligned in sync with each other. In one implementation, to prevent the power limit for power supply 145 from being exceeded, or to minimize the amount of time that the power limit for power supply 145 is exceeded, one or more of processors 105A-N delay the start of execution of their computation tasks. This causes a misalignment of phases in the work being executed by processors 105A-N and reduces the peak power consumption of system 100. The misalignment of phases also decreases the amount of time processors 105A-N are required to operate in a reduced power-performance state. As a result, processors 105A-N are able to complete their tasks in a faster, more efficient manner. In various implementations, processors 105A-N and/or control unit 110 initiate the misalignment of phases. Control unit 110 is implemented using any suitable combination of hardware and/or software. In one implementation, control unit 110 is implemented as software executing on one or more of processors 105A-N.

In various implementations, computing system 100 is a computer, laptop, mobile device, server, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1 and/or one or more of the components shown in computing system 100 are omitted. Additionally, in other implementations, computing system 100 is structured in other ways than shown in FIG. 1.

Figure 2:
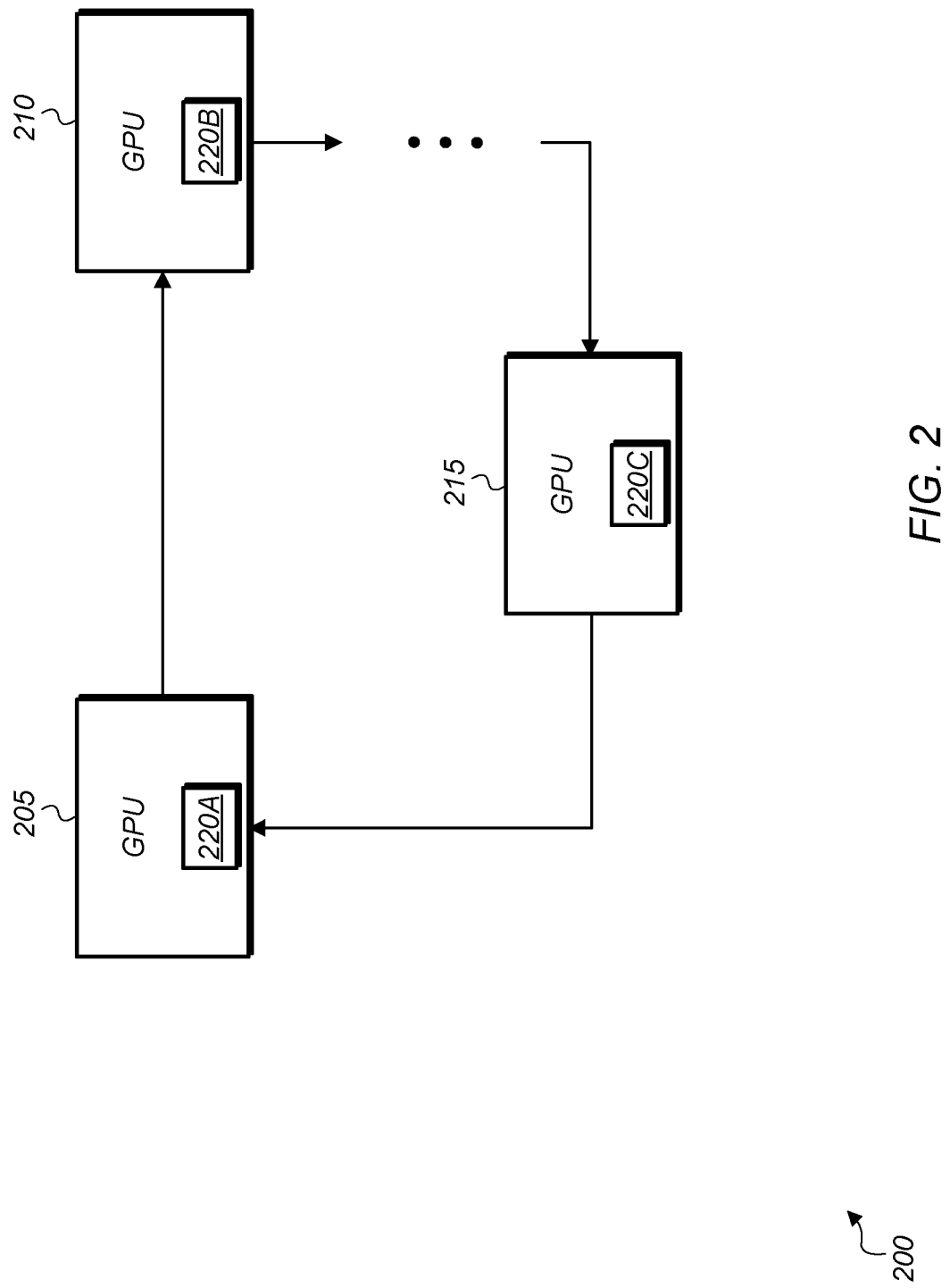
FIG. 2 is a block diagram of another implementation of a computing system.

Turning now to FIG. 2, a block diagram of another implementation of a computing system 200 is shown. In one implementation, computing system 200 includes a plurality of GPUs 205, 210, and 215 connected together in a ring topology. GPUs 205, 210, and 215 are representative of any number of GPUs that are included in system 200, with the number varying from implementation to implementation. Additionally, in other implementations, system 200 includes other types of processing units, such as FPGAs, ASICs, DSPs, or any combination thereof, arranged in a ring topology. GPUs 205, 210, and 215 use the ring topology to share information with each other about the global state, power consumption data, task starting times, task durations, and/or other metrics. In other implementations, GPUs 205, 210, and 215 are connected together using any of various other suitable topologies.

In one implementation, GPUs 205, 210, and 215 work together to implement a distributed neural network. In various implementations, GPUs 205, 210, and 215 send information about the initiation of layers of a neural network. For example, when GPU 205 starts processing a first layer of the neural network, GPU 205 sends an indication of this to GPU 210, which passes the indication on to the next GPU, and so on. GPUs 210 and 215 also send information about their status in regard to the initiation of the various layers of the neural network. In some implementations, GPUs 205, 210, and 215 also specify the type of propagation (e.g., forward propagation, back propagation) that is being implemented as well as additional information associated with the neural network.

In some implementations, GPU 205 sends an indication of which type of phase is being performed. For example, when GPU 205 is fetching data associated with the first layer, GPU 205 sends an indication that a memory access phase is being performed. When GPU 205 is processing the fetched data, GPU 205 sends an indication that a compute phase is being performed. The other GPUs can also do likewise. Additionally, GPUs 205, 210, and 215 share information about their individual power consumption. For example, GPU 205 sends data specifying its latest power consumption status, GPU 210 sends data specifying its latest power consumption status, and so on. GPUs 205, 210, and 215 use this information to determine when a given power limit is being exceeded. When the given power limit is exceeded, this will cause the power supplied to each GPU of GPUs 205, 210, and 215 to be throttled. This will cause a slowdown in the implementation of the neural network. However, the GPUs 205, 210, and 215 can take corrective action to prevent or reduce the amount of time that the power limit is exceeded.

In one implementation, if GPUs 205, 210, and 215 collectively determine that the given power limit will be exceeded for a given layer of the neural network, GPUs 205, 210, and 215 respond by staggering the alignment of the various phases of the given layer. For example, in one implementation, in response to determining that the given power limit has been exceeded or predicting that the given power limit will be exceeded, GPUs 205, 210, and 215 are subdivided into first and second groups. The first group of GPUs performs the phases of the layer in the normal fashion. The second group of GPUs delay the start of the computation phase so that it does not align with the computation phase performed by the first group of GPUs. By causing the computation phase of the first and second groups of GPUs to be misaligned, the power limit will be exceeded for a lower percentage of time. This allows the layers of the neural network to be processed in less time than if the computation phases of all GPUs 205, 210, and 215 were aligned.

In one implementation, each GPU 205, 210, and 215 includes a corresponding register 220A-C which stores the number of layers of the neural network being implemented. In this implementation, once a power consumption pattern is detected for the neural network, GPUs 205, 210, and 215 check the value stored in registers 220A-C, respectively, to determine the number of layers remaining in the neural network during which this power consumption pattern will continue. GPUs 205, 210, and 215 are then able to stagger the alignment of phases for the correct number of remaining layers of the neural network. In one implementation, registers 220A-C are programmed during the initiation of execution of the neural network. In other implementations, the total number of layers of the neural network is stored in other locations which are accessibly by GPUs 205, 210, and 215.

Figure 3:
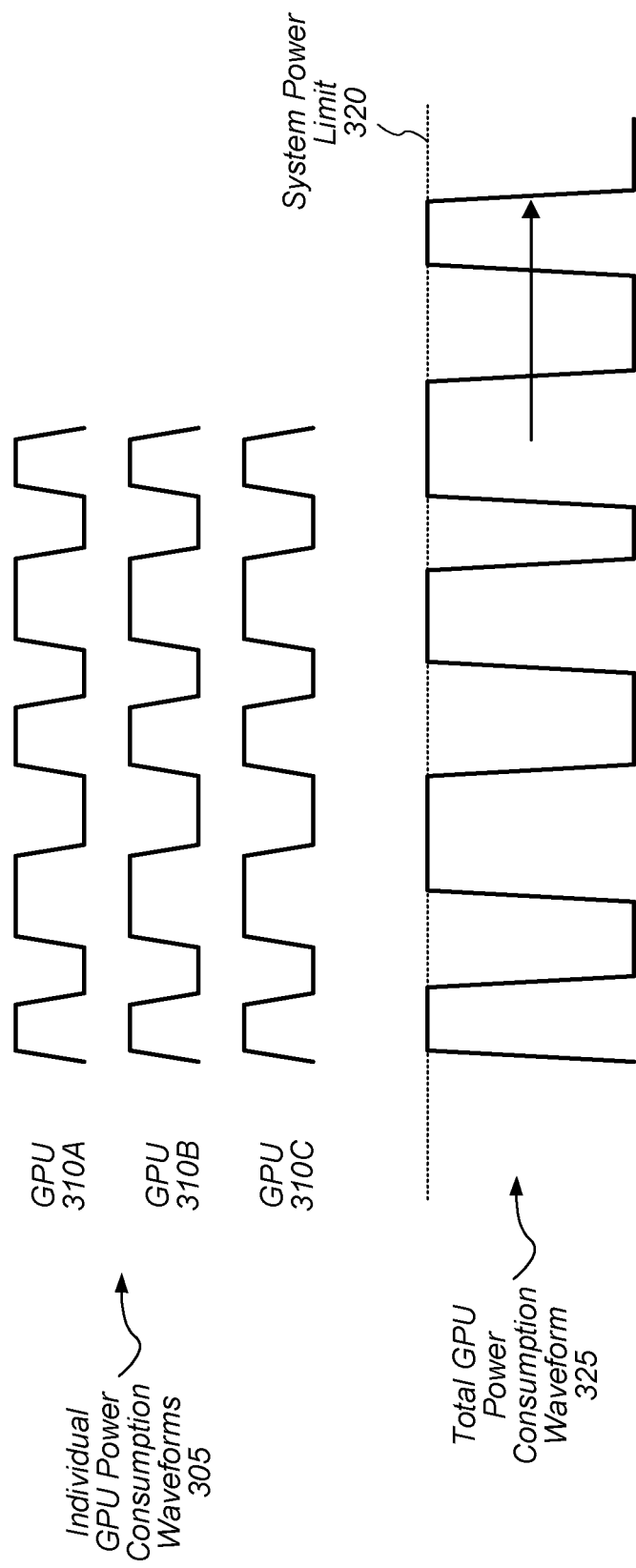
FIG. 3 illustrates a plot of power consumption over time by a plurality of GPUs implementing a neural network in accordance with one implementation.

Referring now to FIG. 3, a plot of one implementation of power consumption by a plurality of GPUs implementing a neural network is shown. Individual GPU power consumption waveforms 305 are shown at the top of FIG. 3 for GPUs 310A-C which are executing the phases of a computing task in parallel. In one implementation, the computing task is the implementation of a neural network. In other implementations, the computing task is any of various other types of workloads. GPUs 310A-C are representative of any number of GPUs which are operating together as part of a computing system and drawing power from a common power supply. Total GPU power consumption waveform 325 represents the total power draw of all GPUs 310A-C from the card, server, or other configuration to which they belong.

As can be seen from the individual GPU power consumption waveforms 305 for GPUs 310A-C, the power draw pattern of each GPU 310A-C is aligned with the other GPUs. In other words, the GPUs 310A-C are operating in synchronization with each other. In one implementation, each GPU 310A-C initiates a given layer of the neural network at the same time, resulting in GPUs 310A-C reaching peak power consumption with the same time pattern. In various embodiments, each of the GPUs are executing the same algorithm. In such an embodiment, each of the GPUs will generally have a similar power consumption profile during performance of the algorithm. If the total system power limit 320 is not reached when GPUs 310A-C are operating in sync with each other, then GPUs 310A-C will not be negatively affected by the alignment of their task phases. However, in most systems, operating multiple GPUs 310A-C in parallel for the layers of a neural network will result in system power limit 320 being reached on a regular basis. When system power limit 320 is reached, GPUs 310A-C will have to slow down to reduce power consumption, resulting in a longer execution time for each layer of the neural network. This is shown in total GPU power consumption waveform 325 as the peaks start to spread out as GPUs 310A-C are prevented from operating at a highest power-performance state due to the system exceeding power limit 320. Also, when GPUs 310A-C use less power, they do so in sync with each other, which is far below power limit 320, resulting in inefficient use of the available power.

Figure 4:
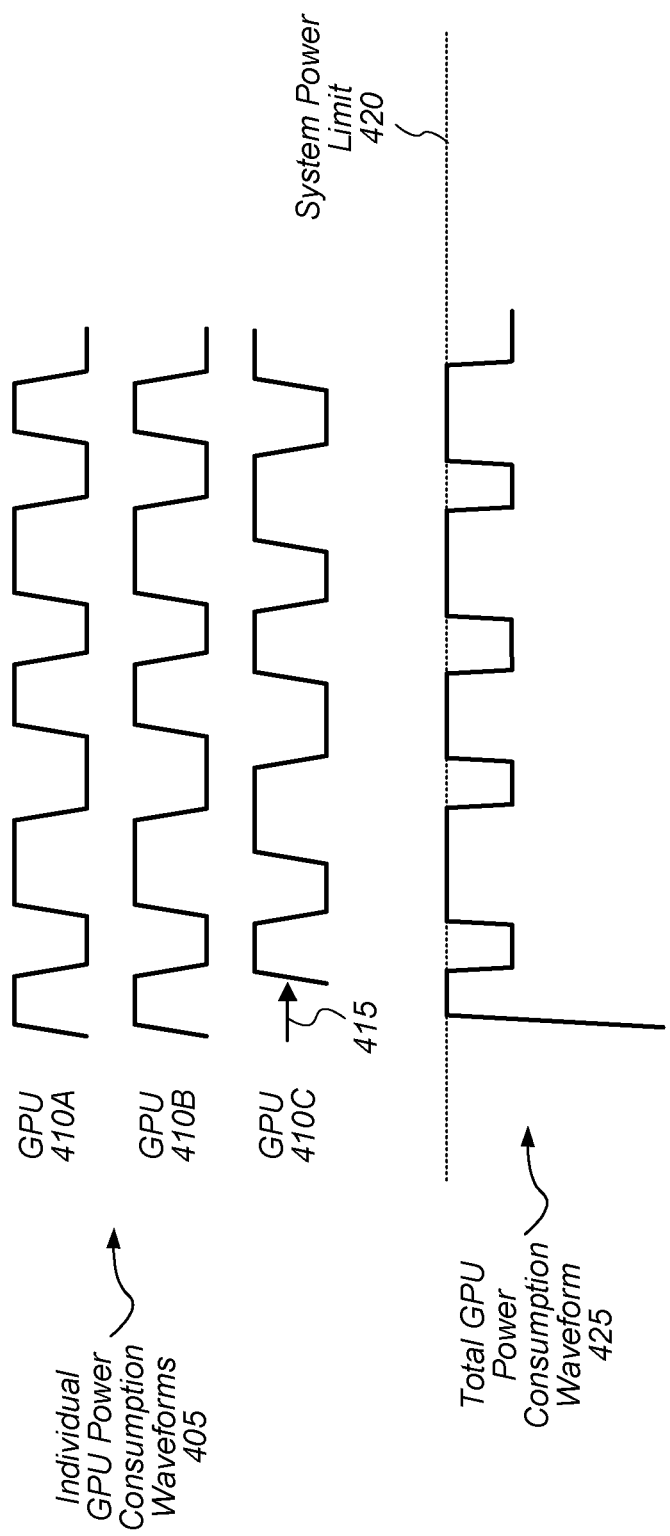
FIG. 4 illustrates a plot of a plurality of GPUs implementing a phase misalignment scheme in accordance with one implementation.

Turning now to FIG. 4, a plot of one implementation of GPUs executing a misalignment scheme is shown. In one implementation, the misalignment scheme illustrated in FIG. 4 involves GPUs 410A-C communicating regarding the power draw situations. Also, GPUs 410A-C learn the patterns in power consumption over time so that the patterns can be exploited for energy optimization. GPUs 410A-C exploit the deterministic nature of a neural network implementation to accurately predict and estimate the power consumption for subsequent layers based on the detected power consumption pattern. Once the power consumption pattern is determined, GPUs 410A-C implement the misalignment scheme to more efficiently use the power provided by a common power supply.

To implement the misalignment scheme, one or more GPUs 410A-C delay execution when the total group of GPUs 410A-C are predicted to draw more power than the system can deliver. Using this scheme, the overall execution time is minimized as more of the available power is consumed during the time intervals that otherwise would be under-utilized. Generally speaking, as a result of implementing the misalignment scheme, when some of the GPUs are drawing less power, other GPUs are drawing more power, allowing the available power to be used efficiently on a more consistent basis. This is achieved by causing the execution phase of at least on GPU to be misaligned with respect to the execution phases of the other GPUs working as part of the same neural network. This allows the overall execution of the neural network to be completed more quickly as compared with using the traditional approach.

Individual GPU power consumption waveforms 405 are shown for GPUs 410A-C at the top of FIG. 4. Rather than having all GPUs 410A-C operating in alignment with each other, GPU 410C delays the start of execution by delay amount 415. By postponing the start of execution by delay amount 415, GPU 410C ensures that its peak power draw occurs when GPUs 410A-B are drawing the least amount of power. In other implementations, other numbers of GPUs other than one GPU will delay the start of execution of a given layer of a neural network to create a misalignment in computation phases among the plurality of GPUs. In one implementation, GPU 410C makes the decision to delay its execution by amount 415 based on the power consumption data and execution start time data received from the other GPUs 410A-B. In another implementation, a single GPU is designated as the master GPU, and the master GPU (e.g., GPU 410A) sends a command to GPU 410C to delay its execution by amount 415. In another implementation, control logic or a control unit (e.g., control unit 110 of FIG. 1) performs an analysis and makes the decision for at least one GPU to delay its execution based on data received from the plurality of GPUs. In this implementation, based on the analysis, the control unit sends a command to GPU 410C to delay its execution by amount 415.

The pattern of peak power consumption of GPUs 410A-B aligning with the lowest power consumption of GPU 410C and peak power consumption of GPU 410C aligning with the lowest power consumption of GPUs 410A-B continues for the remainder of the processing of the neural network layers. This approach results in a more efficient utilization of the total power available to the system. The total GPU power consumption waveform 425 at the bottom of FIG. 4 illustrates how the misalignment approach better utilizes the available power as compared to the implementation illustrated in FIG. 3. The system power limit 420 is reached for shorter periods of time in waveform 425 as compared to waveform 325 of FIG. 3, and the power consumption does not dip as much for waveform 425 in between peaks as compared to waveform 325. As a result, execution of the neural network for the misalignment scheme shown in FIG. 4 is able to complete faster as compared to execution of the neural network for the scheme shown in FIG. 3.

Figure 5:
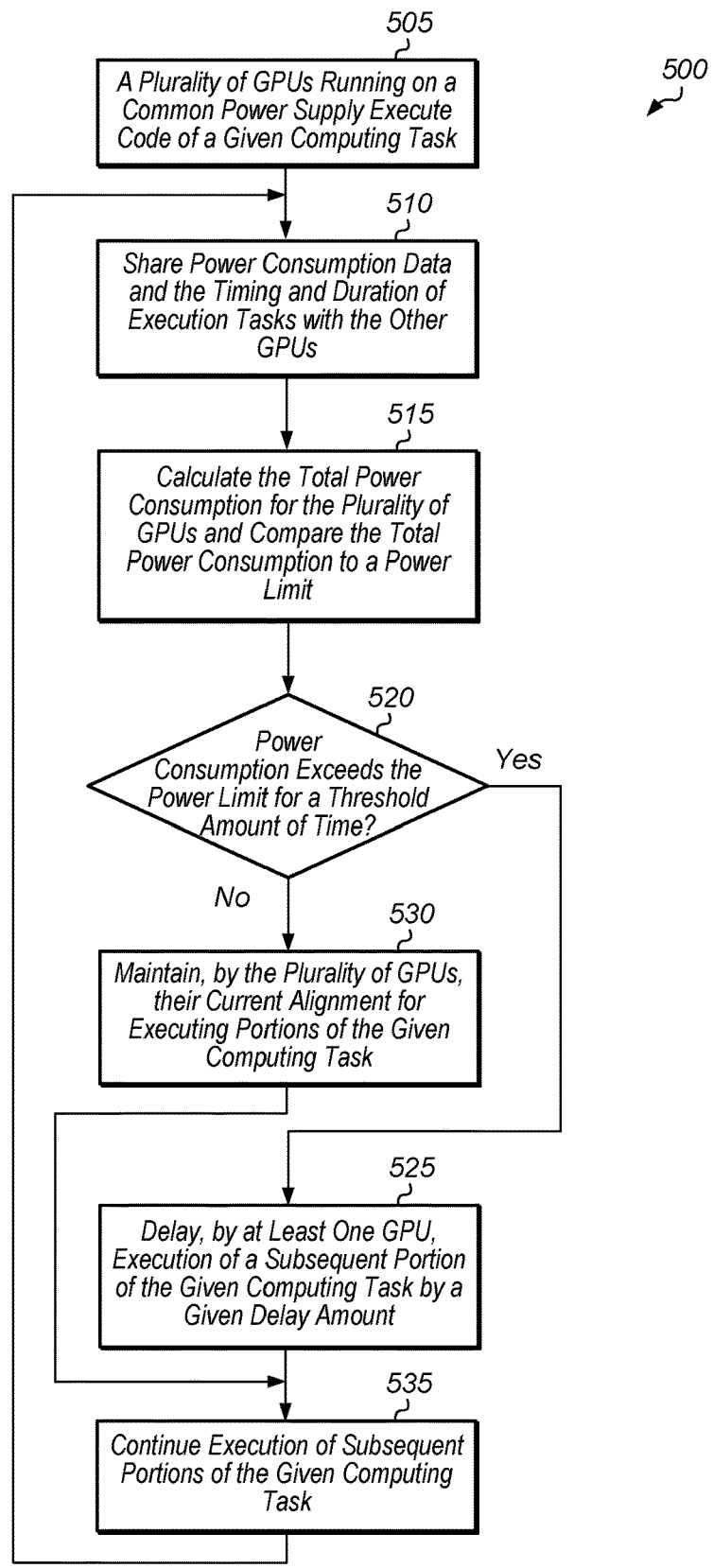
FIG. 5 is a generalized flow diagram illustrating one implementation of a method for scheduling execution of tasks to minimize execution time for a multi-GPU system with a common power supply.

Referring now to FIG. 5, one implementation of a method 500 for scheduling execution of tasks to minimize execution time for a multi-GPU system with a common power supply is shown. For purposes of discussion, the steps in this implementation and those of FIG. 6-9 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 500.

A plurality of GPUs running on a common power supply execute code of a given computing task (block 505). In one implementation, the given computing task is a neural network implementation. It should be understood that in other implementations, other types of processing units besides GPUs execute the code of the given computing task. The plurality of GPUs share power consumption data and the timing and duration of execution tasks with the other GPUs (block 510). At least one GPU calculates the total power consumption for the plurality of GPUs and compares the total power consumption to a power limit (block 515). In another implementation, a control unit (e.g., control unit 110 of FIG. 1) calculates the total power consumption for the plurality of GPUs and compares the total power consumption to a power limit for the common power supply. In some implementations, the total power consumption for the plurality of GPUs is added to the expected or measured power consumption of other components of the system prior to being compared to the power limit for the common power supply. The other components of the system include those components which are also drawing power from the common power supply. In another implementation, the term "power limit" refers to the power available to the plurality of GPUs, and only the power consumption of the plurality of GPUs is compared to the power limit in this implementation.

If the power consumption exceeds the power limit for more than a threshold amount of time (conditional block 520, "yes" leg), then at least one GPU delays execution of a subsequent portion of the given computing task by a given delay amount (block 525). In one implementation, the subsequent portion of the given computing task is a set of computations for a subsequent layer of a neural network. The value of the threshold amount of time varies from implementation to implementation. In one implementation, the threshold amount of time is equal to the amount of time it takes for a selected GPU to execute a portion of the given computing task. In another implementation, the given value is equal to an average of the duration of executing a portion of the given computing task by the plurality of GPUs. Next, the plurality of GPUs continue execution of subsequent portions of the given computing task (block 535). After block 535, method 500 returns to block 505.

Otherwise, if the power consumption does not exceed the power limit for more than the threshold amount of time (conditional block 520, "no" leg), then the plurality of GPUs maintain their current alignment for executing portions of the given computing task (block 530). After block 530, the plurality of GPUs continue execution of subsequent portions of the given computing task (block 535).

Figure 6:
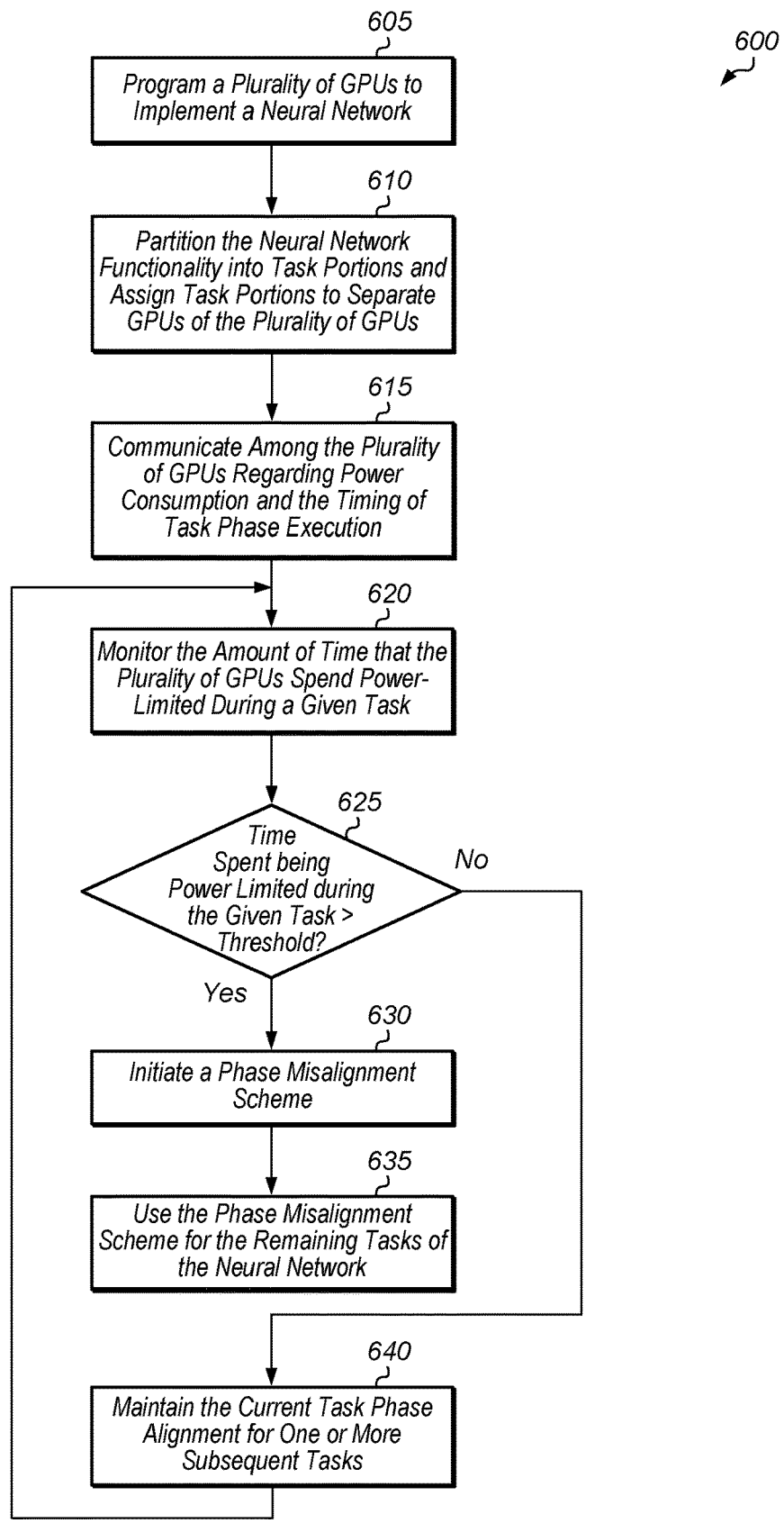
FIG. 6 is a generalized flow diagram illustrating one implementation of a method for determining an alignment of different phases of neural network processing.

Turning now to FIG. 6, one implementation of a method for determining an alignment of different phases of neural network processing is shown. A plurality of GPUs are programmed to implement a neural network (block 605). It is assumed for the purposes of this discussion that the plurality of GPUs draw power from a common power supply. As part of implementing the neural network, the neural network functionality is partitioned into task portions and assigned to separate GPUs of the plurality of GPUs (block 610). During implementation of the neural network, the plurality of GPUs communicate with each other regarding power consumption and the timing of task phase execution (block 615).

The plurality of GPUs also monitor the amount of time that is spent being power-limited during a given task (block 620). The time spent being power-limited refers to the amount of time when the power limit of the power supply has been reached. If the time that the plurality of GPUs spend being power-limited during the given task is greater than a threshold (conditional block 625, "yes" leg), then the plurality of GPUs initiate a phase misalignment scheme (block 630). One example of implementing a phase misalignment scheme is described below during the discussion of method 700 of FIG. 7. Next, the initiated phase misalignment scheme is used for the remaining tasks of the neural network (block 635). After block 635, method 600 ends. If the time that the plurality of GPUs spend being power-limited during the given task is less than or equal to the threshold (conditional block 625, "no" leg), then the plurality of GPUs maintain their current task phase alignment for one or more subsequent tasks (block 640). After block 640, method 600 returns to block 620.

Figure 7:
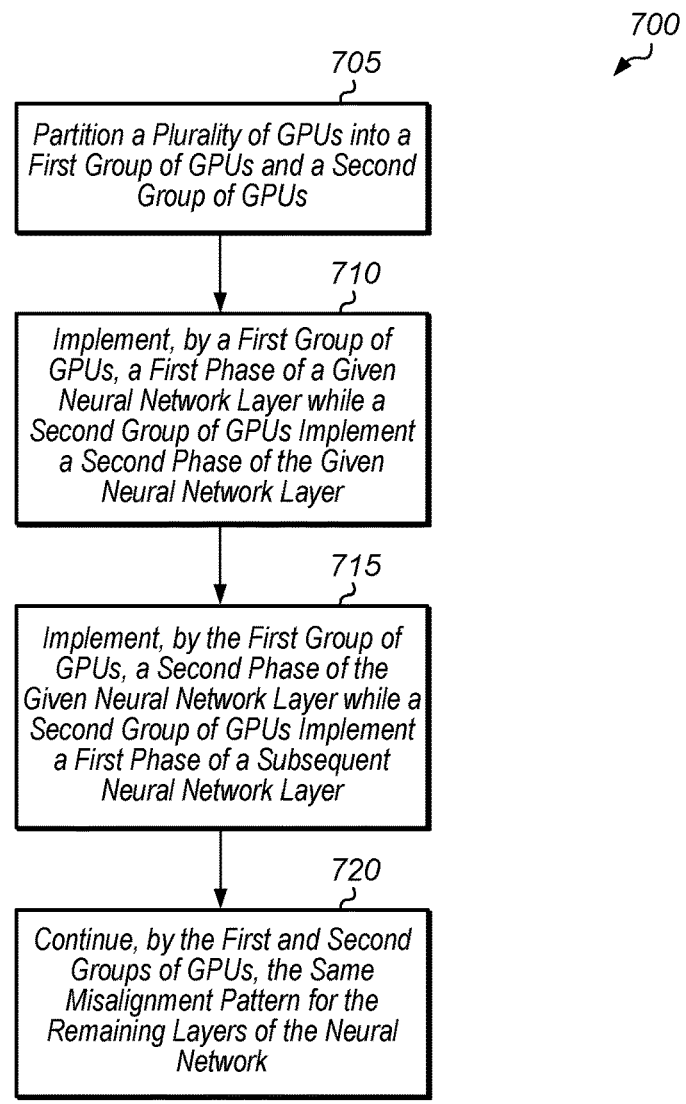
FIG. 7 is a generalized flow diagram illustrating one implementation of a method for implementing a phase misalignment scheme.

Referring now to FIG. 7, one implementation of a method 700 for implementing a phase misalignment scheme is shown. As part of implementing a phase misalignment scheme, at the beginning of a given layer of a neural network, the plurality of GPUs are partitioned into a first group of GPUs and a second group of GPUs (block 705). The specific number of GPUs in the first and second groups varies according to the implementation, with the possible number of GPUs per group ranging from 1 to (N-1), wherein N is the total number of GPUs in the system. For example, in one implementation, if there are a total of 16 GPUs in the system, the first group has 8 GPUs and the second group has 8 GPUs. In other implementations, the GPUs do not have to be evenly divided into the first and second groups. For example, in another implementation, when the total number of GPUs is 16, the first group has 14 GPUs and the second group has 2 GPUs. It is noted that the first and second groups can also be referred to as subsets.

After partitioning the GPUs into the first and second groups, the first group of GPUs implement a first phase of a given neural network layer while the second group of GPUs implement a second phase of the given neural network layer (block 710). In one implementation, the first phase is a memory access phase and the second phase is a computation phase. For example, while the first group of GPUs are retrieving data associated with the given layer from memory, the second group of GPUs are computing values associated with the given layer. In one implementation, the computation phase uses a relatively large amount of power while the memory access phase uses a relatively small amount of power. In one implementation, this misalignment of phases is achieved by the first group of GPUs delaying the start of their execution. In a similar fashion, the first group of GPUs implement a second phase of the given neural network layer while the second group of GPUs implement a first phase of a subsequent neural network layer (block 715). This staggering of phases between the two groups helps to reduce the amount of time that the total power consumption of the plurality of GPUs exceeds the power limit of the power supply. This staggering of phases between the two groups also helps to spread out the power consumption more evenly over time rather than having power consumption alternating between periods with relatively high power draws following by periods with relatively low power draws. The first and second groups of GPUs continue using the same misalignment pattern for the remaining layers of the neural network (block 720). After block 720, method 700 ends.

Figure 8:
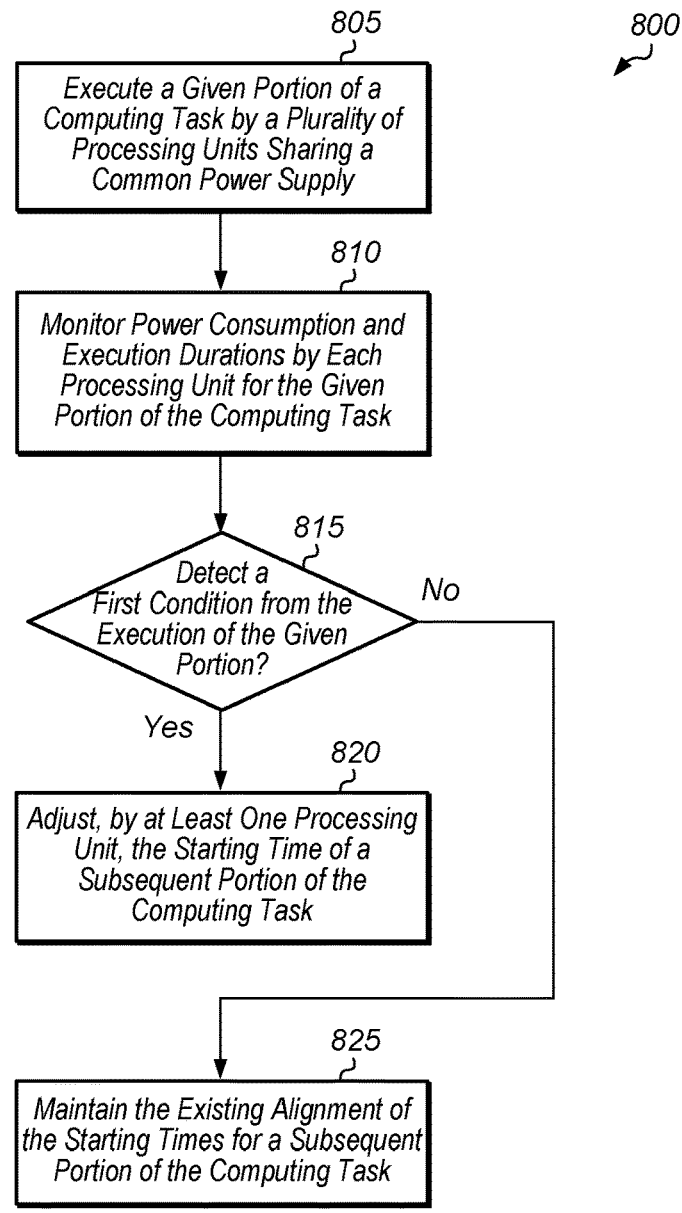
FIG. 8 is a generalized flow diagram illustrating one implementation of a method for adjusting an execution starting time of a task.

Turning now to FIG. 8, one implementation of a method 800 for adjusting an execution starting time of a task is shown. A plurality of processing units, sharing a common power supply, execute a given portion of a computing task (block 805). In one implementation, the computing task is the implementation of a neural network, and the given portion is a given layer of the neural network. The plurality of processing units monitor power consumption and execution durations by each processing unit for the given portion of the computing task (block 810).

If a first condition is detected from the execution of the given portion based on the monitored power consumption and execution durations (conditional block 815, "yes" leg), then at least one processing unit adjusts the starting time of a subsequent portion of the computing task (block 820). In one implementation, adjusting the starting time involves delaying the starting time of the subsequent portion so that the subsequent portion is executed after the other processing units execute their corresponding portions. By adjusting the starting time of the subsequent portion of the computing task, the plurality of processing units achieve more efficient use of the common power supply.

If a first condition is not detected from the execution of the given portion (conditional block 815, "no" leg), then the plurality of processing units maintain the existing alignment of the starting times for a subsequent portion of the computing task (block 825). After block 825, method 800 ends. In one implementation, the first condition is a threshold number of processing units having a synchronized alignment during execution of the given portion. In another implementation, the first condition is the total power consumption exceeding a power limit for a threshold amount of time. In a further implementation, the first condition is the total execution time needed to complete the given portion exceeding a specified duration. In a still further implementation, the first condition is the power consumption falling below a power threshold for a given duration. The power consumption can fall below the power threshold for the given duration if most or all processing units are performing a low-power task phase at the same time. This results in an inefficient usage of the available power supply. In other implementations, the first condition is any of various other conditions.

Figure 9:
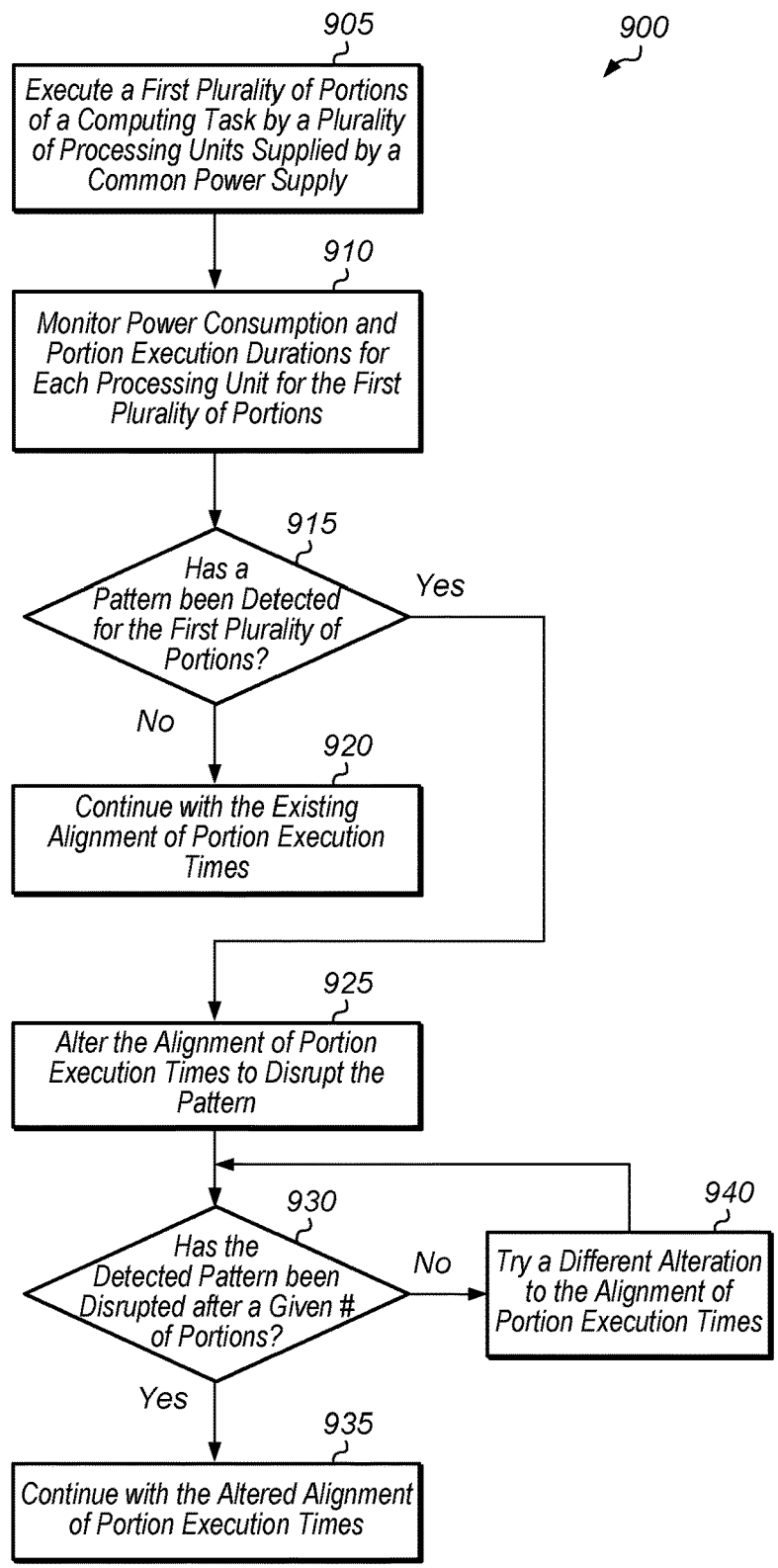
FIG. 9 is a generalized flow diagram illustrating one implementation of a method for detecting patterns in portions of a computing task being executed by a plurality of processing units.

Referring now to FIG. 9, one implementation of a method 900 for detecting patterns in portions of a computing task being executed by a plurality of processing units is shown. A plurality of processing units supplied by a common power supply execute a first plurality of portions of a computing task (block 905). In one implementation, the processing units are GPUs, the computing task is a neural network, and the first plurality of portions are a plurality of layers of the neural network. In other implementations, other types of processing units, other types of computing tasks, and/or other types of portions of the computing task are performed in block 905. In one implementation, the plurality of processing units are connected together in a ring topology. In other implementations, the plurality of processing units are connected together in other ways. The plurality of processing units monitor power consumption and portion execution durations for each processing unit for the first plurality of portions (block 910).

Next, the plurality of processing units determine if a pattern is detected in the individual power consumption and portion execution times for the first plurality of portions (conditional block 915). Any of various pattern detection techniques are utilized, depending on the implementation. In one implementation, the plurality of processing units determine if the portion execution times are aligned among a threshold number of processing units. The threshold number varies according to the implementation. If the portion execution times are aligned for a threshold number of processing units, then the plurality of processing units determine if the total power consumption for the plurality of processing units exceeds a power limit during this alignment of portion execution times. In one implementation, if total power consumption for the plurality of processing units exceeds a power limit during this alignment of portion execution times, then the plurality of processing units will conclude that a pattern exists. In other implementations, other techniques for detecting patterns are possible and are contemplated.

If a pattern of exceeding the power limit is not detected based on the individual power consumption and portion execution times for the first plurality of portions (conditional block 915, "no" leg), then the plurality of processing units continue with the existing alignment of portion execution times (block 920). After block 920, method 900 ends. If a pattern of exceeding the power limit is detected based on the individual power consumption and portion execution times for the first plurality of portions (conditional block 915, "yes" leg), then the plurality of processing units alter the alignment of portion execution times to disrupt the pattern (block 925). In one implementation, the alignment of portion execution times is altered by having a first group of processing units delay the start of the execution of their portion of the computing task. In other implementations, other techniques for altering the alignment of portion execution times are possible and are contemplated.

After block 925, if the detected pattern has been disrupted after a given number of subsequent portions (conditional block 930, "yes" leg), then the plurality of processing units continue with the altered alignment of portion execution times (block 935). After block 935, method 900 ends. The given number of subsequent portions varies according to the implementation. If the detected pattern has not been disrupted after the given number of subsequent portions (conditional block 930, "no" leg), then the plurality of processing units try a different alteration to the alignment of portion execution times (block 940). For example, in one implementation, a different alteration is selecting a different group of processing units for altering the start of executing their portions of the computing task. In another implementation, a different alteration involves adjusting the start of execution by a different delay amount. Other alterations are possible and are contemplated. After block 940, method 900 returns to conditional block 930.

Figure 10:
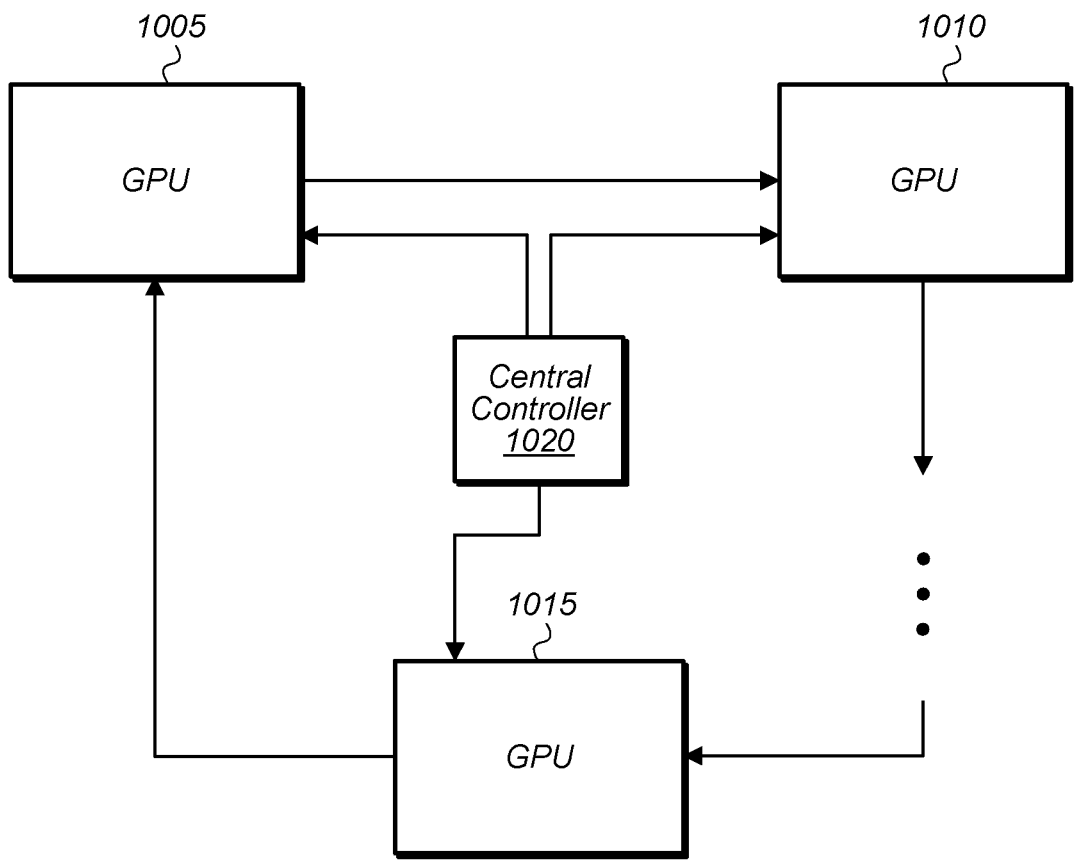
FIG. 10 is a block diagram of another implementation of a computing system.

Turning now to FIG. 10, a block diagram of another implementation of a computing system 1000 is shown. In one implementation, computing system 1000 includes a central controller 1020 connected to a plurality of GPUs 1005, 1010, and 1015. In one implementation, GPUs 1005, 1010, and 1015 are connected together in a ring topology. GPUs 1005, 1010, and 1015 are representative of any number of GPUs that are included in system 1000, with the number varying from implementation to implementation. GPUs 1005, 1010, and 1015 use the ring topology to share information with each other about the global state, power consumption data, task starting times, task durations, and/or other metrics. In other implementations, GPUs 1005, 1010, and 1015 are connected together using any of various other suitable topologies. GPUs 1005, 1010, and 1015 also share information with central controller 1020. In another implementation, central controller 1020 is connected in the ring topology with GPUs 1005, 1010, and 1015 instead of having individual connections to each GPU as is shown in FIG. 10.

In one implementation, GPUs 1005, 1010, and 1015 work together to implement a distributed neural network. In various implementations, GPUs 1005, 1010, and 1015 send information about the initiation of layers of a neural network to each other and to central controller 1020. For example, when GPU 1005 starts processing a first layer of the neural network, GPU 1005 sends an indication of this to GPU 1010, which passes the indication on to the next GPU, and so on as well as sending the indication to central controller 1020. GPUs 1010 and 1015 also send information about their status in regard to the initiation of the various layers of the neural network. In some implementations, GPUs 1005, 1010, and 1015 also specify the type of propagation (e.g., forward propagation, back propagation) that is being implemented as well as additional information associated with the neural network.

In some implementations, GPU 1005 sends an indication of which type of phase is being performed to the other GPUs and to central controller 1020. For example, when GPU 1005 is fetching data associated with the first layer, GPU 1005 sends an indication that a memory access phase is being performed. When GPU 1005 is processing the fetched data, GPU 1005 sends an indication that a compute phase is being performed. The other GPUs can also do likewise. Additionally, GPUs 1005, 1010, and 1015 share information with central controller 1020 about their individual power consumption. For example, GPU 1005 sends data specifying its latest power consumption status, GPU 1010 sends data specifying its latest power consumption status, and so on. Central controller 1020 uses this information to determine when a given power limit is being exceeded. When the given power limit is exceeded, this will cause the power supplied to each GPU of GPUs 1005, 1010, and 1015 to be throttled. This will cause a slowdown in the implementation of the neural network. However, the GPUs 1005, 1010, and 1015 can take corrective action to prevent or reduce the amount of time that the power limit is exceeded.

In one implementation, if central controller 1020 determines that the given power limit will be exceeded for a given layer of the neural network, central controller 1020 sends requests to GPUs 1005, 1010, and 1015 to stagger the alignment of the various phases of the given layer. For example, in one implementation, in response to determining that the given power limit has been exceeded or predicting that the given power limit will be exceeded, central controller 1020 divides GPUs 1005, 1010, and 1015 into first and second groups. Central controller 1020 commands the first group of GPUs to perform the phases of the layer in the normal fashion. Central controller 1020 commands the second group of GPUs to delay the start of the computation phase so that it does not align with the computation phase performed by the first group of GPUs. By causing the computation phase of the first and second groups of GPUs to be misaligned, the power limit will be exceeded for a lower percentage of time. This allows the layers of the neural network to be processed in less time than if the computation phases of all GPUs 1005, 1010, and 1015 were aligned.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   a plurality of processing units; and
   one or more links between the plurality of processing units;
   wherein a first processing unit of the plurality of processing units is configured to:
      partition a common computing task into a plurality of task portions; and
      assign the plurality of task portions to the plurality of processing units other than the first processing unit;
   wherein each processing unit other than the first processing unit of the plurality of processing units is configured to perform an assigned task portion of the plurality of task portions; and
   wherein at least one processing unit of the plurality of processing units assigned one of the plurality of task portions is configured to change a time at which a given task portion of the plurality of task portions is performed with respect to task portions being performed by other processing units, wherein the change in time comprises delaying a start of execution of the given task portion to a later time, responsive to power consumption data received by the at least one processing unit from another one of the plurality of processing units assigned a task portion of the plurality of task portions, wherein the power consumption data corresponds to power consumed by the another one of the plurality of processing units.

2. The system as recited in claim 1, wherein the at least one processing unit is further configured to change the time, responsive to determining a number of processing units which share a computing task phase alignment is greater than a threshold.

3. The system as recited in claim 1, wherein:
the computing task performed by each of the plurality of processing units comprises a same algorithm; and
the at least one processing unit is configured to change the time is responsive to a determination that a power limit of a power supply shared by the plurality of processing units is exceeded.

4. The system as recited in claim 1, wherein the processing unit is configured to change the time based at least in part on a determination that execution of the given task portion overlaps with execution of one or more other task portions of the plurality of task portions.

5. The system as recited in claim 1, wherein the at least one processing unit is configured to change the time in further response to detecting a pattern in power consumption and task portion execution times of the plurality of task portions.

6. The system as recited in claim 5, wherein the plurality of processing units are implementing at least one of a machine learning model and a neural network.

7. The system as recited in claim 1, wherein each of the plurality of processing units assigned one of the plurality of task portions communicates to one another information comprising one or more of power consumption and task execution phases via the one or more links.

8. A method comprising:
partitioning, by a first processing unit of a plurality of processing units, a common computing task into a plurality of task portions;
assigning, by the first processing unit, the plurality of task portions to the plurality of processing units other than the first processing unit;
performing, by each processing unit other than the first processing unit of the plurality of processing units, an assigned task portion of the plurality of task portions;
receiving, by at least one processing unit of the plurality of processing units assigned one of the plurality of task portions, power consumption data from another one of the plurality of processing units assigned a task portion of the plurality of task portions, wherein the power consumption data corresponds to power consumed by the another one of the plurality of processing units; and
changing, by the at least one processing unit of the plurality of processing units, a time at which a given computing task portion of the plurality of task portions is performed with respect to tasks being performed by other processing units, wherein the change in time comprises delaying a start of execution of the given task portion to a later time, based at least in part on the power consumption data.

9. The method as recited in claim 8, further comprising changing the time, by the at least one processing unit, responsive to determining a number of processing units which share a computing task phase alignment is greater than a threshold.

10. The method as recited in claim 8, wherein:
the computing task performed by each of the plurality of processing units comprises a same algorithm; and
the at least one processing unit is configured to change the time is responsive to determining that a power limit of a power supply shared by the plurality of processing units is exceeded.

11. The method as recited in claim 8, wherein changing the time is based at least in part on determining that execution of the given task portion overlaps with execution of one or more other task portions of the plurality of task portions.

12. The method as recited in claim 11, further comprising changing the time, by the at least one processing unit, responsive to detecting a pattern in power consumption and task portion execution times of the plurality of task portions.

13. The method as recited in claim 12, wherein the plurality of processing units are implementing at least one of a machine learning model and a neural network.

14. The method as recited in claim 8, further comprising communicating information between each of the plurality of processing units assigned one of the plurality of task portions, wherein the information comprises one or more of power consumption and task execution.

15. An apparatus comprising:
a first processing unit; and
a plurality of processing units;
wherein the first processing unit is configured to:
partition a common computing task into a plurality of task portions; and assign the plurality of task portions to the plurality of processing units; and
wherein at least one processing unit of the plurality of processing units is configured to:
perform an assigned task portion of the plurality of task portions; and
change a time at which a given task portion of the plurality of task portions is performed with respect to task portions being performed by other processing units, wherein the change in time comprises delaying a start of execution of the given task portion to a later time, responsive to power consumption data received by the at least one processing unit from another one of the plurality of processing units assigned a task portion of the plurality of task portions, wherein the power consumption data corresponds to power consumed by the another one of the plurality of processing units.

16. The apparatus as recited in claim 15, wherein the at least one processing unit is further configured to change the time, responsive to further determining a number of processing units which share a computing task phase alignment is greater than a threshold.

17. The apparatus as recited in claim 15, wherein:
the computing task performed by each of the plurality of processing units comprises a same algorithm; and
the at least one processing unit is configured to change the time at responsive to a determination that a power limit of a power supply shared by the plurality of processing units is exceeded.

18. The apparatus as recited in claim 15, wherein the change in time is based at least in part on a determination that execution of the given task portion overlaps with execution of one or more other task portions of the plurality of task portions.

19. The apparatus as recited in claim 18, wherein the at least one processing unit is configured to change the time in further response to detecting a pattern in power consumption and task portion execution times of the plurality of task portions.

20. The apparatus as recited in claim 15, wherein each of the plurality of processing units assigned one of the plurality of task portions communicates to one another information comprising one or more of power consumption and task execution phases.

* * * * *